United States Patent
Furuta et al.

(10) Patent No.: US 11,934,012 B2
(45) Date of Patent: Mar. 19, 2024

(54) OPTICAL ADJUSTMENT APPARATUS, OPTICAL ADJUSTMENT METHOD, AND OPTICAL DEVICE

(71) Applicant: Panasonic Intellectual Property Management Co., Ltd., Osaka (JP)

(72) Inventors: Tomotaka Furuta, Osaka (JP); Junichi Kamatani, Nara (JP); Tatsuro Shiraishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 74 days.

(21) Appl. No.: 17/723,529

(22) Filed: Apr. 19, 2022

(65) Prior Publication Data
US 2022/0365287 A1 Nov. 17, 2022

(30) Foreign Application Priority Data

May 17, 2021 (JP) .................................. 2021-083303

(51) Int. Cl.
*G02B 6/30* (2006.01)
*G02B 6/36* (2006.01)
(Continued)

(52) U.S. Cl.
CPC ............. *G02B 6/30* (2013.01); *G02B 6/3636* (2013.01); *G02B 6/422* (2013.01); *G02B 6/4227* (2013.01); *G02B 6/0008* (2013.01)

(58) Field of Classification Search
CPC ........ G02B 6/30; G02B 6/4219; G02B 6/422; G02B 6/4221; G02B 6/4222;
(Continued)

(56) References Cited

U.S. PATENT DOCUMENTS 4,334,774 A * 6/1982 Glass .................... G02B 6/4227
338/18
4,867,524 A * 9/1989 Courtney ............. G02B 6/3636
385/95
(Continued)

FOREIGN PATENT DOCUMENTS

EP 358592 B1 * 5/1995 ............... G02B 6/30
EP 724172 A2 * 7/1996 ............... G02B 6/30
(Continued)

OTHER PUBLICATIONS

Abbink H C, Machine Translation of JP-3853841-B2, 2006. (Year: 2006).*

(Continued)

*Primary Examiner* — Michelle R Connelly
(74) *Attorney, Agent, or Firm* — Wenderoth, Lind & Ponack, L.L.P.

(57) ABSTRACT

An optical adjustment apparatus includes a measurement-light irradiation part that has a plurality of second optical fibers and emits, with timings different from each other, a plurality of lights having a single wavelength via the second optical fibers, an optical fiber block that holds exit-side end portions of the first and second optical fibers, a light detection part that receives and detects a plurality of reflected lights via the second optical fibers, a tilt calculation part that compares, with each other, variations with time of intensities of the respective reflected lights and calculates a tilt of the optical fiber block relative to the optical substrate, and a distance calculation part that calculates an inter-end surface distance between the optical substrate and the optical fiber block, based on a variation with time of an intensity of at least one reflected light.

13 Claims, 8 Drawing Sheets

(51) Int. Cl.
*G02B 6/42* (2006.01)
*F21V 8/00* (2006.01)

(58) Field of Classification Search
CPC .. G02B 6/4224; G02B 6/4225; G02B 6/4226; G02B 6/4227; G02B 27/62
See application file for complete search history.

(56) References Cited

U.S. PATENT DOCUMENTS

| | | | |
|---|---|---|---|
| 6,404,955 B1 | 6/2002 | Kikuchi et al. | |
| 6,690,864 B1* | 2/2004 | Dee | G02B 6/4219 385/52 |
| 6,847,766 B2* | 1/2005 | Kim | G02B 6/3668 385/52 |
| 6,888,652 B2* | 5/2005 | Miyake | G02B 6/4225 359/223.1 |
| 6,918,269 B2* | 7/2005 | Wang | G02B 6/30 385/98 |
| 7,236,680 B1* | 6/2007 | Jordan | G02B 6/4225 385/52 |
| 2003/0020903 A1* | 1/2003 | Healy | G02B 6/4216 356/138 |
| 2009/0148100 A1* | 6/2009 | Hasegawa | G02B 6/30 385/52 |
| 2011/0239438 A1* | 10/2011 | Ogawa | G02B 6/4227 385/52 |
| 2011/0246116 A1 | 10/2011 | Kamitani et al. | |
| 2018/0003907 A1* | 1/2018 | Gomi | G01L 5/00 |
| 2023/0120780 A1* | 4/2023 | Blaicher | G01N 21/64 250/459.1 |
| 2023/0296847 A1* | 9/2023 | Lawson | G02B 6/3684 385/52 |

FOREIGN PATENT DOCUMENTS

| | | | | |
|---|---|---|---|---|
| JP | 08043676 A | * | 2/1996 | G02B 6/30 |
| JP | 2005043479 A | * | 2/2005 | G02B 6/4204 |
| JP | 2005-508015 | | 3/2005 | |
| JP | 3853841 B2 | * | 12/2006 | G02B 6/30 |
| JP | 2008-256784 | | 10/2008 | |
| JP | 2011-215005 | | 10/2011 | |
| JP | 2012211939 A | * | 11/2012 | |
| JP | 2014-228444 | | 12/2014 | |
| JP | 2017-32950 | | 2/2017 | |
| WO | WO-2006051447 A1 | * | 5/2006 | G02B 6/4225 |

OTHER PUBLICATIONS

Ono, Machine Translation of JP-2005043479-A, 2005. (Year: 2005).*
Ishikawa, Machine Translation of JP-08043676-A, 1996. (Year: 1996).*

* cited by examiner

FIG. 6

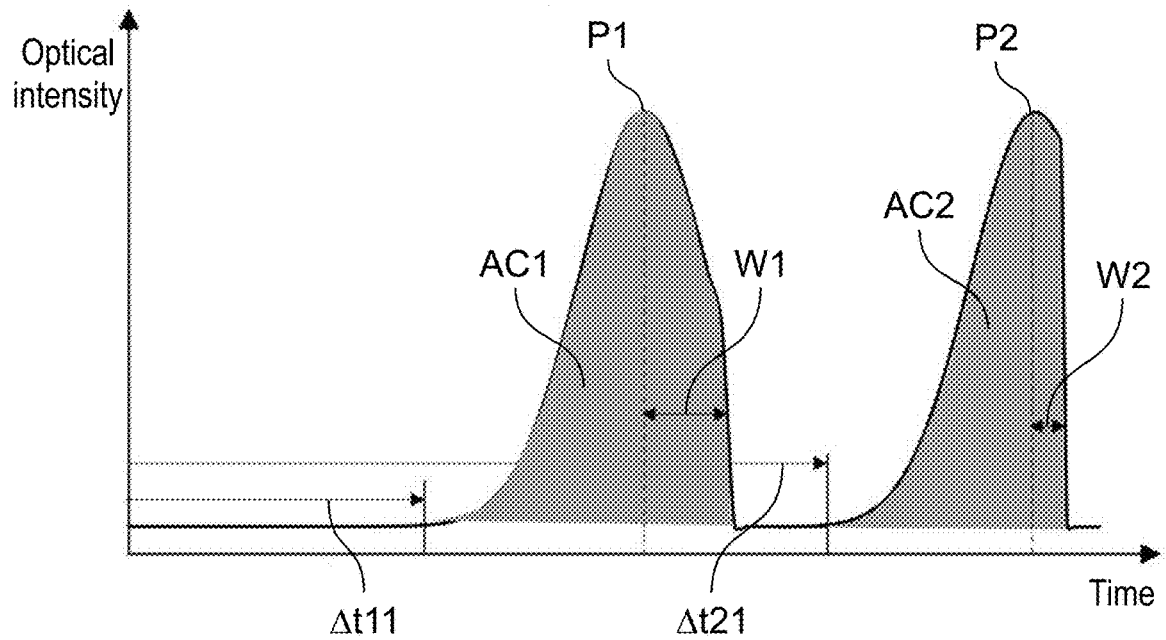

FIG. 7

| | $\theta_x$ | | $\theta_y$ | |
|---|---|---|---|---|
| Tilt 0 | AC1=AC3, and AC2=AC4, and W1=W3, and W2=W4 | | AC1=AC2, and AC3=AC4, and W1=W2, and W3=W4 | |
| Tilt ≠0 | Second optical fibers 106, 107 are close, and second optical fibers 108, 109 are distant. | AC1>AC3, and AC2>AC4, and W1>W3, and W2>W4 | Second optical fibers 106, 108 are close, and second optical fibers 107, 109 are distant. | AC1>AC2, and AC3>AC4, and W1>W2, and W3>W4 |
| | Second optical fibers 106, 107 are distant, and second optical fibers 108, 109 are close. | AC1<AC3, and AC2<AC4, and W1<W3, and W2<W4 | Second optical fibers 106, 108 are distant, and second optical fibers 107, 109 are close. | AC1<AC2, and AC3<AC4, and W1<W2, and W3<W4 |

OPTICAL ADJUSTMENT APPARATUS, OPTICAL ADJUSTMENT METHOD, AND OPTICAL DEVICE

BACKGROUND

1. Technical Field

When an optical fiber is coupled to an optical substrate, i.e., a coupling destination such as a substrate holding an optical fiber or a substrate provided with a waveguide, the optical axis of the optical fiber is adjusted to maximize the intensity of light propagating through a core of the optical substrate.

The adjustment to the optical axis of the optical fiber is performed while moving the exit-end surface of the optical fiber close to an incident-end surface of the optical substrate. If the exit-end surface of the optical fiber comes in contact with the incident-end surface of the optical substrate, these end surfaces of the optical fiber and optical substrate can be damaged. Such damage to these end surfaces causes a decrease in propagation efficiency of the light that propagates from the optical fiber to the optical substrate.

Therefore, in order to avoid such contact between the optical fiber and the optical substrate, the adjustment to the optical axis of the optical fiber is performed while measuring an inter-end surface distance between the optical fiber and the optical substrate.

Patent Literature 1 discloses a distance measurement apparatus that emits light with different wavelengths from an optical fiber toward an optical substrate, a coupling destination, measures the intensity of light reflected off the optical substrate, and calculates an inter-end surface distance between the optical fiber and the optical substrate based on the wavelength dependence of intensity of the thus-measured reflected light.

CITATION LIST

Patent Literature

PTL 1: Japanese Patent Unexamined Publication No. 2014-228444

SUMMARY

An optical adjustment apparatus according to an aspect of the present disclosure is an optical adjustment apparatus for use in coupling a first optical fiber to an optical substrate being a coupling destination, the first optical fiber having an exit-side end portion, the optical substrate having a substrate-end surface. The optical adjustment apparatus includes: a measurement-light irradiation part that includes a plurality of second optical fibers having exit-side end portions and is configured to emit a plurality of lights with respective timings different from each other via the plurality of second optical fibers, the plurality of lights having a single wavelength; an optical fiber block that is configured to hold the exit-side end portion of the first optical fiber and the exit-side end portions of the plurality of second optical fibers, the optical fiber block having a block-end surface; a light detection part that is configured to receive and detect a plurality of reflected lights via the plurality of second optical fibers, the plurality of reflected lights being reflected off the substrate-end surface of the optical substrate and corresponding to the plurality of lights; a tilt calculation part that is configured to compare, with each other, variations with time of intensities of the plurality of respective reflected lights and to calculate a tilt of the optical fiber block relative to the optical substrate, based on a result of the comparison of the variations with time; and a distance calculation part that is configured to calculate an inter-end surface distance between the substrate-end surface of the optical substrate and the block-end surface of the optical fiber block, based on a variation with time of an intensity of at least one of the plurality of reflected lights.

An optical adjustment method according to an aspect of the present disclosure is an optical adjustment method for use in coupling a first optical fiber to an optical substrate being a coupling destination, and includes the steps of: holding, with an optical fiber block, an exit-side end portion of the first optical fiber and exit-side end portions of a plurality of second optical fibers for use in measurement; emitting, with respective timings different from each other, a plurality of lights having a single wavelength via the plurality of second optical fibers; receiving and detecting a plurality of reflected lights via the plurality of respective second optical fibers, the plurality of reflected lights being reflected off a substrate-end surface of the optical substrate and corresponding respectively to the plurality of lights; comparing, with each other, variations with time of intensities of the plurality of respective reflected lights and calculating a tilt of the optical fiber block relative to the optical substrate, based on a result of the comparison of the variations with time; and calculating an inter-end surface distance between the substrate-end surface of the optical substrate and a block-end surface of the optical fiber block, based on a variation with time of an intensity of at least one of the plurality of reflected lights.

An optical device according to an aspect of the present disclosure includes: a first optical fiber; an optical substrate that includes a waveguide and is a coupling destination for the first optical fiber; and an optical fiber block that is fixed to the optical substrate and holds the first optical fiber, the optical fiber block including a plurality of through holes in which a plurality of lines inter-connecting the plurality of through holes constitutes a triangle.

BRIEF DESCRIPTION OF THE DRAWINGS

FIG. 6 is an enlarged diagram illustrating some of the peaks illustrated in FIG. 4;

FIG. 7 is a table showing correspondence relationships between tilts and detection results of reflected lights;

DETAILED DESCRIPTIONS

Exemplary Embodiments

In cases where the exit-end surface of an optical fiber is tilted relative to an incident-end surface of an optical substrate, the amount of light that is reflected off the optical substrate and can be received by the optical fiber, is small. With a distance measurement apparatus disclosed in PTL1, since a distance is calculated based on the light reflected off the optical substrate, a decrease in the amount of received reflected light results in a reduced accuracy of the distance measurement. For this reason, when the distance measurement apparatus disclosed in PTL1 is used, an adjustment prior to the distance measurement is required such that the exit-end surface of the optical fiber becomes parallel with the incident-end surface of the optical substrate.

The distance measurement apparatus disclosed in PTL1 cannot measure a tilt of the optical fiber relative to the optical substrate, a coupling destination; therefore, an additional apparatus is necessary for measuring the tilt.

An object of the present disclosure is to present an optical adjustment apparatus, an optical adjustment method, and an optical device, which are all capable of accurately measuring the distance of an optical fiber relative to an optical substrate, a coupling destination, without preparing any additional apparatus.

Hereinafter, embodiments of the present disclosure will be described with reference to the drawings. Note that the constituent elements that are common throughout the figures are designated by the same numerals and symbols, and their explanations are appropriately omitted.

Figure 1:
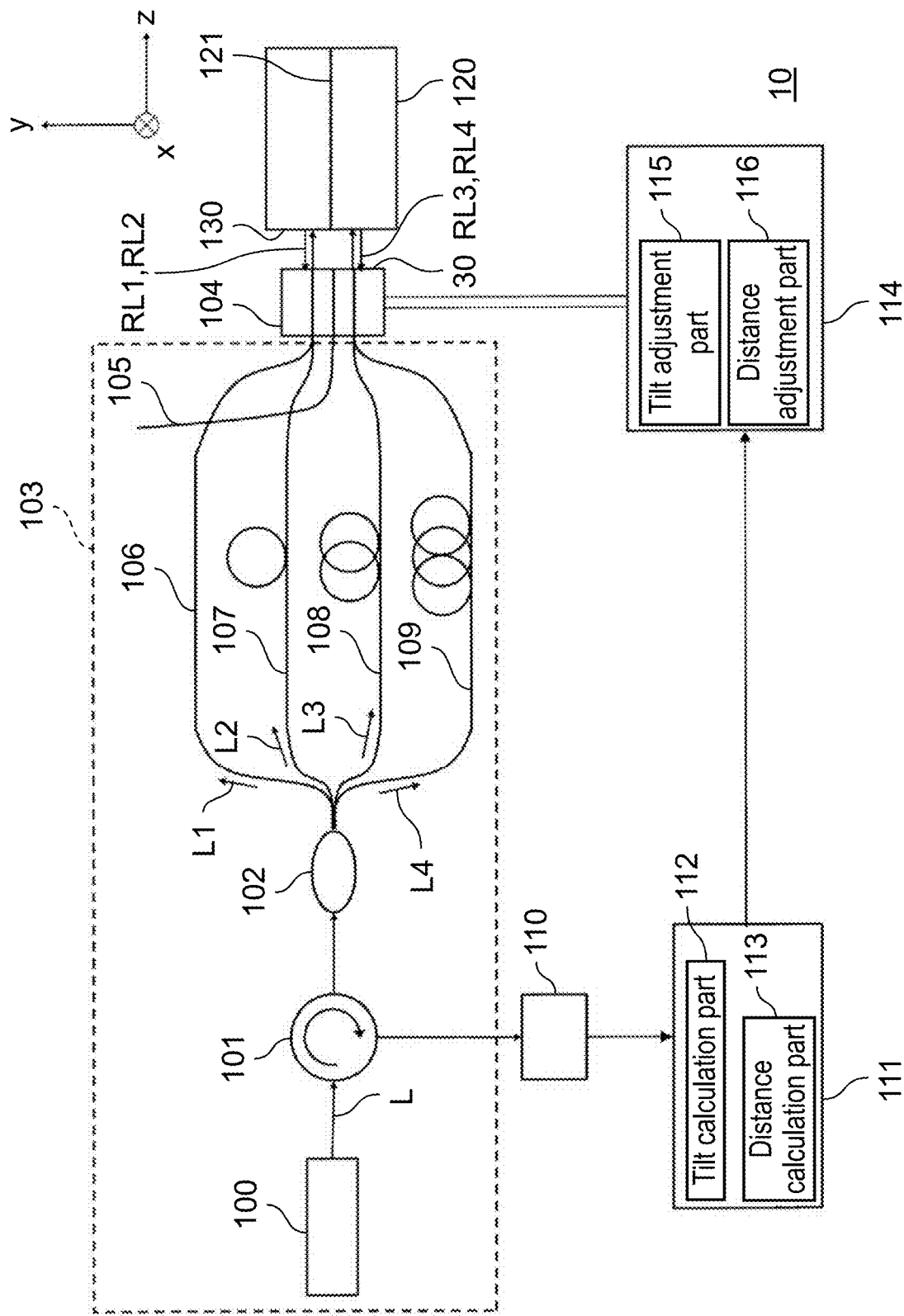
FIG. 1 is a schematic diagram illustrating an optical adjustment apparatus according to an embodiment.

FIG. 1 is a schematic diagram illustrating optical adjustment apparatus 10 according to an embodiment. Optical adjustment apparatus 10 is used to adjust the optical axis of first optical fiber 105 when coupling first optical fiber 105 to waveguide 121 of optical substrate 120, a coupling destination. Specifically, optical adjustment apparatus 10 is configured to be capable of measuring both a tilt of block-end surface 30 of optical fiber block 104 relative to substrate-end surface 130 of optical substrate 120 and an inter-end surface distance between substrate-end surface 130 and block-end surface 30. Optical substrate 120 is, for example, a substrate on which an optical circuit is formed. Note that substrate-end surface 130 is an end surface of optical substrate 120, with light from second optical fibers 106 to 109 being incident on this end surface. Block-end surface 30 is an end surface of optical fiber block 104, with this end surface facing substrate-end surface 130.

In the description of the present embodiment, the direction in which optical fiber block 104 to be described later approaches optical substrate 120 is defined as the positive z-axis direction. Moreover, of the two directions that, together with the z-axis, constitute a right-handed coordinate system, one is defined as the positive x-axis direction and the other is defined as the positive y-axis direction. In FIG. 1, the direction from the front to the back is the positive x-axis direction; the upward direction is the positive y-axis direction; the rightward direction is the positive z-axis direction.

Optical adjustment apparatus 10 includes measurement-light irradiation part 103, optical fiber block 104, light detection part 110, calculation part 111, and adjustment device 114.

Measurement-light irradiation part 103 includes a plurality of second optical fibers 106 to 109 for use in measurements. Measurement-light irradiation part 103 emits a plurality of lights L1 to L4 having a single wavelength via second optical fibers 106 to 109, with respective timings different from each other. In the embodiment, measurement-light irradiation part 103 includes light source 100, circulator 101, and optical coupler 102.

Light source 100 is a light emission device that emits light L having a single wavelength. Circulator 101 is a component that changes the traveling direction of light L.

Optical coupler 102 branches light L emitted from light source 100 into a plurality of lights L1 to L4 that all have same intensity, and guides lights L1 to L4 to a plurality of respective second optical fibers 106 to 109.

Second optical fibers 106 to 109 are optical fibers for use in measurements of tilts and distances. Second optical fibers 106 to 109 are held by optical fiber block 104. Moreover, second optical fibers 106 to 109 offer optical path lengths different in length from each other. In the embodiment, each of these fibers increases in length in the order of second optical fiber 106, second optical fiber 107, second optical fiber 108, and second optical fiber 109. Since lights L1 to L4 branched by optical coupler 102 are guided through respective second optical fibers 106 to 109 of different lengths, this causes the different lights to exit with different timings.

Figure 2:
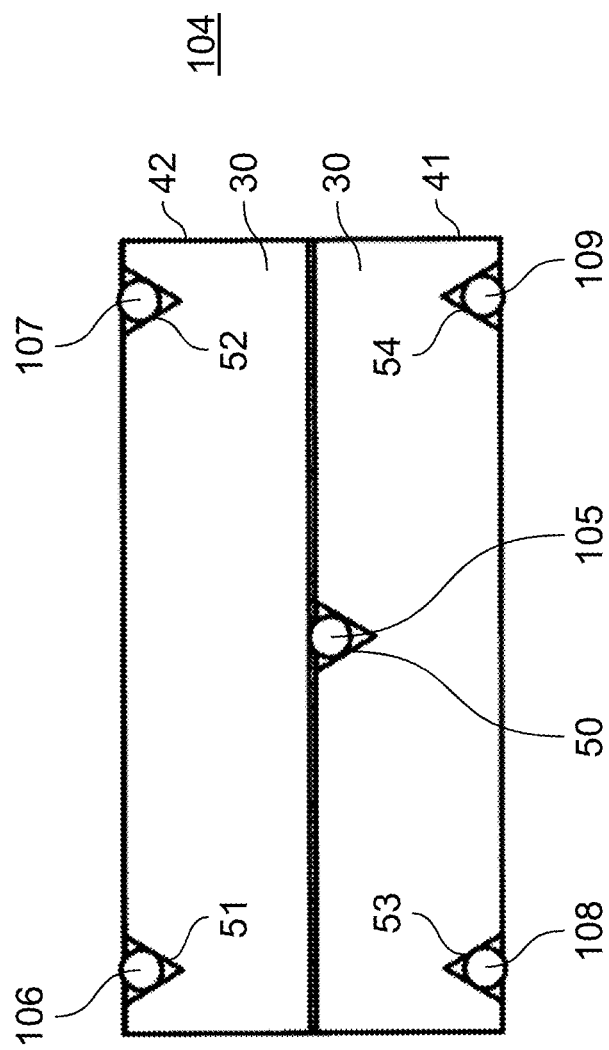
FIG. 2 is a diagram illustrating a positional relation of an optical fiber that is held by an optical fiber block according to the embodiment.

Optical fiber block 104 is a component that holds an exit-side end portion of first optical fiber 105 and exit-side end portions of second optical fibers 106 to 109. First optical fiber 105 and second optical fibers 106 to 109 are disposed in optical fiber block 104 such that each of these fibers is flush with block-end surface 30. Optical fiber block 104 includes, for example, holder 41 and lid 42 as shown in FIG. 2. Holder 41 is a component provided with a groove in which first optical fiber 105 is disposed. Lid 42 is a component corresponding to a lid for holder 41. Setting lid 42 to be in contact with such a grooved surface of holder 41, the groove of holder 41 and the contact surface of lid 42 constitute through hole 50 that can hold first optical fiber 105 at the center portion of optical fiber block 104.

In addition, in the four corner portions of optical fiber block 104, through holes 51 to 54 are formed. Through holes 51 to 54 are disposed to have a positional relation in which, for three of these through holes, a plurality of lines interconnecting the three constitutes a triangle.

Second optical fibers 106 to 109 are inserted in through holes 51 to 54, respectively. Therefore, second optical fibers 106 to 109 are disposed such that, for three of the exit-end surfaces of second optical fibers 106 to 109, lines interconnecting the three constitute a triangle.

Such an arrangement of second optical fibers 106 to 109 enables the measurement of tilts, at around two axes orthogonal to each other, of block-end surface 30 of optical fiber block 104 relative to substrate-end surface 130 of optical substrate 120.

A plurality of lights L1 to L4 is reflected off substrate-end surface 130 of optical substrate 120, thereby yielding reflected lights RL1 to RL4. Light detection part 110 receives reflected lights RL1 to RL4 via second optical fibers 106 to 109, and detects intensities of reflected lights RL1 to RL4. Light detection part 110 outputs the result of detection to calculation part 111. Note that, after having been guided by second optical fibers 106 to 109, a plurality of reflected lights RL1 to RL4 is subjected to changing of its traveling directions by circulator 101 and is guided to light detection part 110.

Calculation part 111 is a computer having a computing function. Calculation part 111 functions as both tilt calculation part 112 and distance calculation part 113. Calculation part 111 outputs the result of calculation to adjustment device 114. The computer includes, for example, a processor and a memory connected to the processor. The memory stores a program that contains a plurality of commands for executing the calculations of tilts and distances. Execution of the program by the processor results in the functioning of the computer as tilt calculation part 112 and distance calculation part 113.

Tilt calculation part 112 calculates the tilt of block-end surface 30 of optical fiber block 104 relative to substrate-end surface 130 of optical substrate 120, on the basis of the result of detection by light detection part 110. Distance calculation part 113 calculates the inter-end surface distance between block-end surface 30 of optical fiber block 104 and substrate-end surface 130 of optical substrate 120, on the basis of the result of detection by light detection part 110.

Adjustment device 114 includes a drive device (e.g., actuator) that holds optical fiber block 104, and functions as both tilt adjustment part 115 and distance adjustment part 116. Tilt adjustment part 115 adjusts a relative attitude of optical fiber block 104 with respect to optical substrate 120, on the basis of the calculated tilt. Distance adjustment part 116 adjusts a relative distance of optical fiber block 104 with respect to optical substrate 120, on the basis of the calculated inter-end surface distance.

Figure 3:
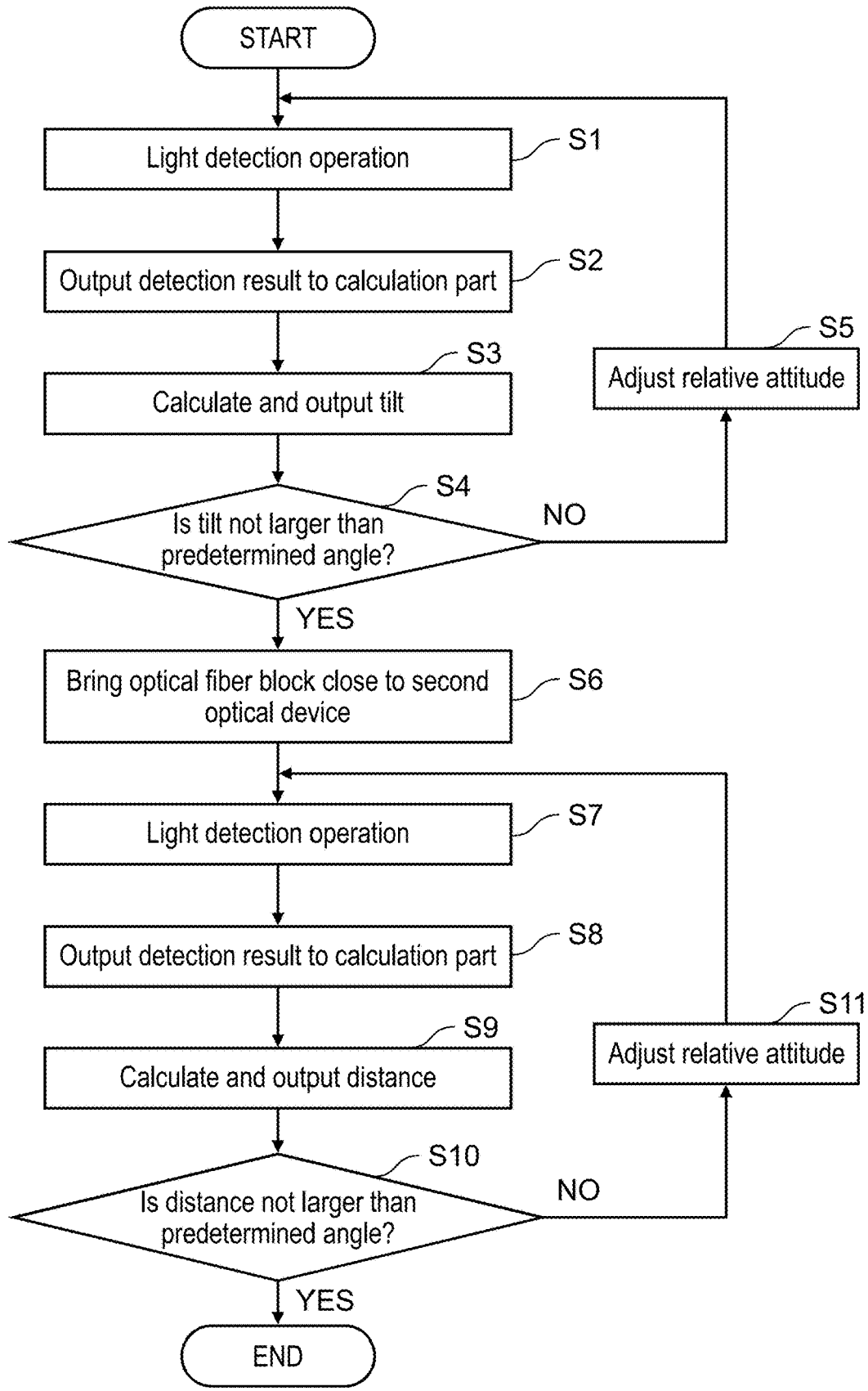
FIG. 3 is a flowchart illustrating a procedure for optical adjustment performed by the optical adjustment apparatus according to the embodiment.

When coupling first optical fiber 105 to optical substrate 120, an optical adjustment to first optical fiber 105 is performed by using optical adjustment apparatus 10. The terms "optical adjustment" as used herein means the performing of adjustment to the relative attitude and relative position of block-end surface 30 of optical fiber block 104 with respect to substrate-end surface 130 of optical substrate 120. FIG. 3 is a flowchart illustrating a procedure for the optical adjustment performed by optical adjustment apparatus 10 according to the embodiment. The optical adjustment method, illustrated in FIG. 3, by using optical adjustment apparatus 10 includes a relative-attitude adjusting process by Steps S1 to S5 and a relative-distance adjusting process by Steps S6 to S10.

In the optical adjustment, first optical fiber 105 and second optical fibers 106 to 109 are attached to optical fiber block 104 of optical adjustment apparatus 10. Then, optical fiber block 104, which holds first optical fiber 105 and second optical fibers 106 to 109, is disposed such that block-end surface 30 of optical fiber block 104 is separated from substrate-end surface 130 of optical substrate 120, slightly to the extent that the both are not reliably in contact with each other. The distance of the separation is, for example, 20 µm.

In the state in which optical fiber block 104 and optical substrate 120 have been disposed as described above, optical adjustment apparatus 10 performs a light-detection operation (Step S1). In Step S1, light source 100 emits light L. Light L passes through circulator 101 and is then branched into a plurality of lights L1 to L4 by optical coupler 102. Lights L1 to L4 exit from the exit-end surfaces of respective second optical fibers 106 to 109 toward substrate-end surface 130 of optical substrate 120.

Since the optical path lengths of lights L1 to L4, from entering to exiting respective second optical fibers 106 to 109, are different from each other, lights L1 to L4 exit with respective timings different from each other. In the embodiment, these lights exit in the order of light L1, light L2, light L3, and light L4.

Lights L1 to L4 having exited are reflected off substrate-end surface 130 of optical substrate 120. Reflected lights RL1 to RL4 are received by respective second optical fibers 106 to 109, pass through respective second optical fibers 106 to 109, optical coupler 102, and circulator 101, and are then detected by light detection part 110. Reflected lights RL1 to RL4 are detected with respective timings different from each other due to different lengths of second optical fibers 106 to 109. In the embodiment, these reflected lights are detected in the order of reflected light RL1, reflected light RL2, reflected light RL3, and reflected light RL4.

Figure 4:
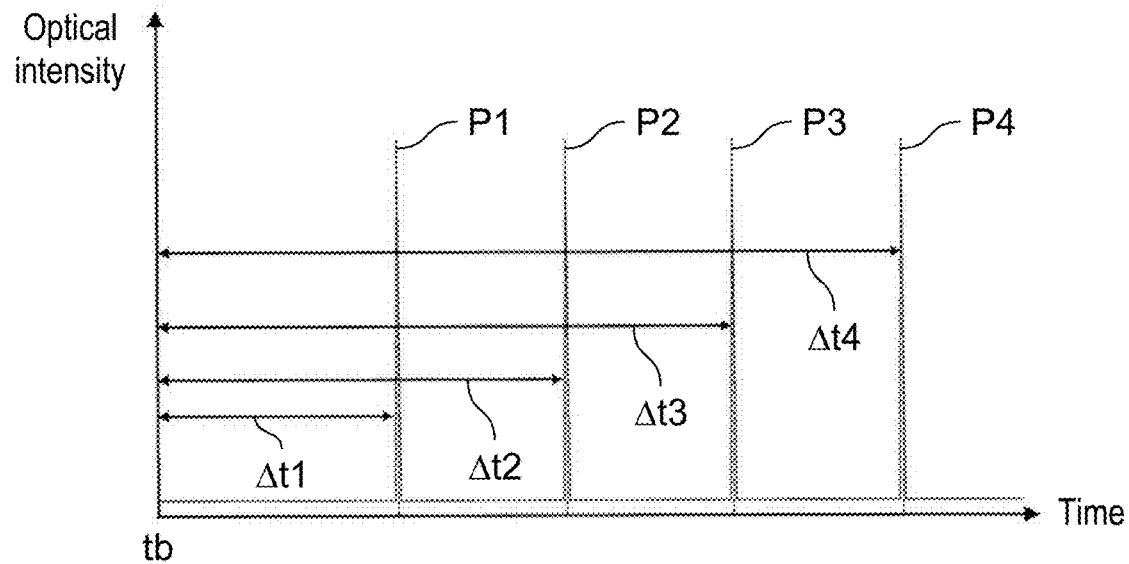
FIG. 4 is a diagram illustrating one example of the result of detecting reflected lights by a light detection part.

FIG. 4 is a diagram illustrating one example of the result of detecting reflected lights RL1 to RL4 by light detection part 110. The vertical and horizontal axes represent light intensity and time, respectively. Note that time tb is the time when light source 100 emits light L.

Peaks P1 to P4 shown in FIG. 4 correspond to reflected lights RL1 to RL4, respectively. The periods of time from time tb to peaks P1 to P4 are $\Delta t1$ to $\Delta t4$, respectively, in which case they are $\Delta t1 < \Delta t2 < \Delta t3 < \Delta t4$ attributed to the lengths of second optical fibers 106 to 109. Peaks P1 to P4 each have a time width. The reason of this is described blow.

Figure 5:
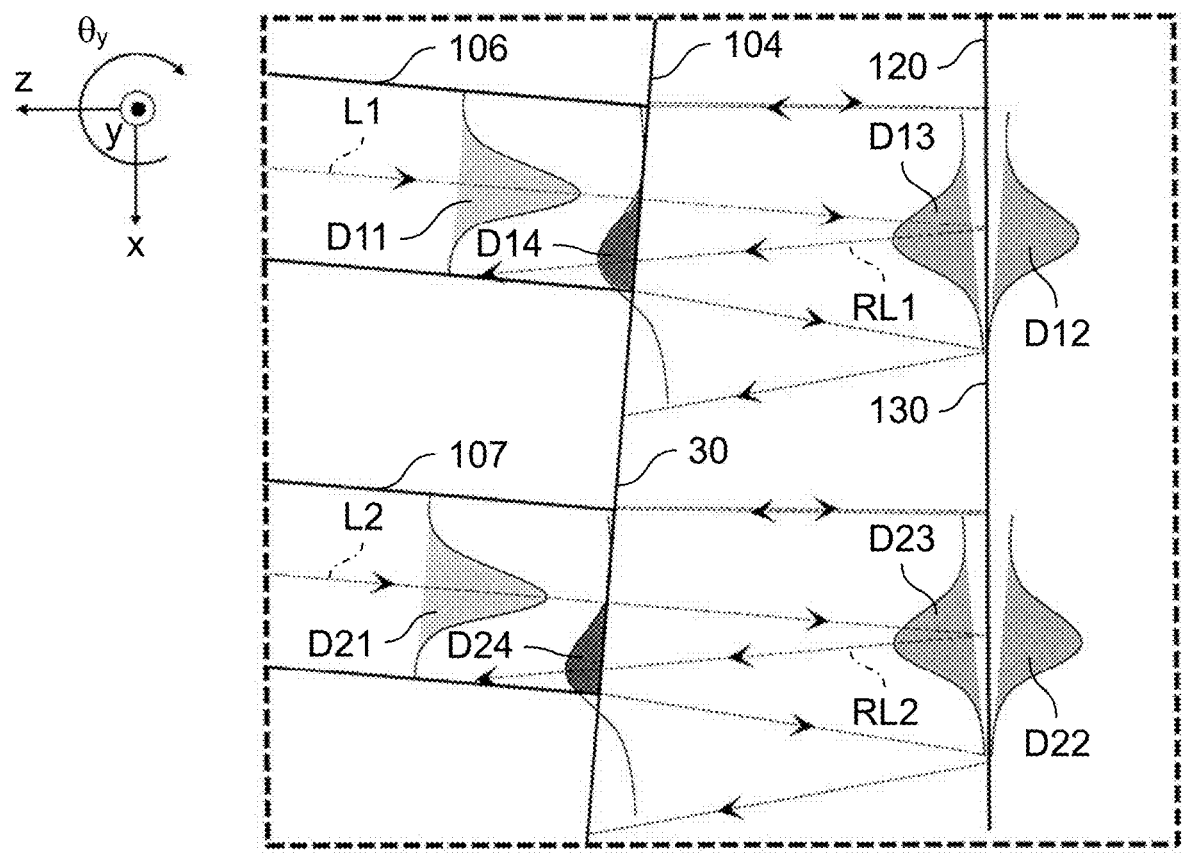
FIG. 5 is a diagram illustrating behavior of lights that exit from second optical fibers, are reflected off a substrate-end surface of an optical substrate, and then return as reflected lights.

FIG. 5 is a diagram illustrating behavior of lights, in which case lights L1 and L2 having exiting from respective second optical fibers 106 and 107 are reflected off substrate-end surface 130 of optical substrate 120 and then return to second optical fibers 106 and 107, as reflected lights RL1 and RL2, respectively.

Intensity spectra D11 to D14 shown in FIG. 5 are respectively the intensity spectrum of light L1 when exiting from second optical fiber 106, the intensity spectrum of light L1 when entering optical substrate 120, the intensity spectrum of reflected light RL1 immediately after light L1 being reflected off optical substrate 120, and the intensity spectrum of reflected light RL1 when entering second optical fiber 106.

Intensity spectra D21 to D24 shown in FIG. 5 are respectively the intensity spectrum of light L2 when exiting from second optical fiber 107, the intensity spectrum of light L2 when entering optical substrate 120, the intensity spectrum of reflected light RL2 immediately after light L2 being reflected off optical substrate 120, and the intensity spectrum of reflected light RL2 when entering second optical fiber 107.

Lights L1 to L4 exiting from second optical fibers 106 to 109 have spreading angles in accordance with numerical apertures of second optical fibers 106 to 109. For this reason, as shown in FIG. 5, the optical axes of the lights (hereinafter, referring occasionally as to "peripheral lights") that exit from peripheral portions of each of second optical fibers 106 and 107, are tilted toward the outer peripheral side relative to the optical axis of the light (hereinafter, referring occasionally as to "center light") that exits from the center portion of corresponding one of second optical fibers 106 and 107.

For example, in the case where block-end surface 30 of optical fiber block 104 is parallel with substrate-end surface 130 of optical substrate 120, the behavior of light is as follows: The center light is perpendicularly incident on and perpendicularly reflected off substrate-end surface 130 of optical substrate 120. On the other hand, the peripheral lights are incident on substrate-end surface 130 of optical substrate 120 from tilted directions, and are reflected off substrate-end surface 130 of optical substrate 120 toward directions in accordance with the angles of incidence. For this reason, there are differences, between the center light and the peripheral lights, in optical path length from the exit of light L1 at second optical fiber 106 to the reception of reflected light RL1. Therefore, reflected light RL1 yielded from the peripheral lights returns to second optical fiber 106 later than reflected light RL1 yielded from the center light.

In this way, there are differences in detection time even for the same reflected lights RL1, in accordance with the exit positions (center portion, peripheral portion, etc.) of lights L1 at the exit-end surface of second optical fiber 106. For this reason, peaks P1 to P4 exhibit respective time widths as shown in FIG. 4.

As described above, after the light-detection operation has been performed in Step S1 of FIG. 3, light detection part 110 outputs the result of detecting reflected lights RL1 to RL4 to calculation part 111 (Step S2). The result of detection is the data of variations with time of the light intensities that have a plurality of peaks corresponding to reflected lights RL1 to RL4 as shown in FIG. 4.

Then tilt calculation part 112 calculates the tilt of block-end surface 30 of optical fiber block 104 relative to substrate-end surface 130 of optical substrate 120, on the basis of the result of detection by light detection part 110, and outputs the thus-calculated tilts to tilt adjustment part 115 (Step S3).

Hereinafter, Step S3 is described using an example of calculating tilt Oy around the y-axis. Note that, in the present description of the embodiment, it is assumed that both tilt Ox around the x-axis and tilt Oy around the y-axis are 0 (zero) degrees when block-end surface 30 of optical fiber block 104 is parallel with substrate-end surface 130 of optical substrate 120.

FIG. 6 is a diagram illustrating variations with time of intensities of the lights detected when optical fiber block 104 and second optical fibers 106 and 107 are in the state shown in FIG. 5. In FIG. 6, Δt11 and Δt21 represent periods of time from time tb when light source 100 emits light L until the time when light detection part 110 starts detecting reflected light RL1 and reflected light RL2.

Integrated values AC1 and AC2 at the times of peaks P1 and P2 are different from each other. Moreover, time widths W1 and W2 at peaks P1 and P2 are also different from each other. Hereinafter, the reason for this will be described. Note that time widths W1 and W2 are periods of time from the times when the light intensities exhibit the maximum at peaks P1 and P2 until the times when the light intensities exhibit the most-delayed ends of peaks P1 and P2, respectively.

As shown in FIG. 5, in the case where block-end surface 30 of optical fiber block 104 is tilted at a predetermined angle relative to substrate-end surface 130 of optical substrate 120, lights L1 and L2 are incident with a tilt on substrate-end surface 130 of optical substrate 120. Then reflected lights RL1 and RL2 travel in respective directions in accordance with the angles of incidence of lights L1 and L2 on substrate-end surface 130. For this reason, part of each of reflected lights RL1 and RL2 does not return to respective second optical fibers 106 and 107. As a result, second optical fibers 106 and 107 cannot receive the parts of respective reflected lights RL1 and RL2.

Specifically, in the case where block-end surface 30 of optical fiber block 104 is tilted relative to substrate-end surface 130 of optical substrate 120, the inter-end surface distance between the exit-end surface of second optical fiber 106 and substrate-end surface 130 of optical substrate 120 is not equal to the inter-end surface distance between the exit-end surface of second optical fiber 107 and substrate-end surface 130 of optical substrate 120.

As shown in FIG. 5, the longer the inter-end surface distance (in FIG. 5, second optical fiber 107) is, the greater the arrival positions of reflected lights RL1 and RL2 shift from the centers of second optical fibers 106 and 107, respectively. For this reason, there is also a difference in amount of light (in the shaded portions of intensity spectra D14 and D24) between reflected lights RL1 and RL2 that arrive second optical fibers 106 and 107, respectively.

As a result, as shown in FIG. 6, the longer the inter-end surface distance is, the smaller the integrated values, AC1 and AC2, at peaks P1 and P2 in variations with time of intensities of the lights are.

Moreover, the longer the inter-end surface distance is, the more the amount of peripheral light that cannot be received increases. Therefore, peaks P1 and P2 of light intensities converge relatively rapidly, which results in a reduction in time widths W1 and W2 that are time widths after the times of the maxima of peaks P1 and P2, respectively. Time widths W1 and W2 correspond to periods of time that are within the respective total peak widths, in the following manner. Time width W1 is the period from the time when the center light corresponding to peak P1 is incident until the time when the corresponding peripheral light is incident after this center light has been incident. Time width W2 is the period from the time when the center light corresponding to peak P2 is incident until the time when the corresponding peripheral light is incident after this center light has been incident.

Tilt calculation part 112 calculates integrated values AC1 and AC2 of peaks P1 and P2 based on the variations with time of intensities of reflected lights RL1 and RL2, respectively, and then compares the resulting values with each other. In addition, tilt calculation part 112 calculates integrated values AC3 and AC4 of peaks P3 and P4 based on the variations with time of intensities of reflected lights RL3 and RL4, respectively, and then compares the resulting values with each other.

Moreover, tilt calculation part 112 calculates time widths W1 and W2 of peaks P1 and P2 corresponding to reflected lights RL1 and RL2, respectively, and then compares the resulting values with each other. In addition, tilt calculation part 112 calculates time widths W3 and W4 of peaks P3 and P4 corresponding to reflected lights RL3 and RL4, respectively, and then compares the resulting values with each other.

On the basis of the following results of comparisons (A1), (A2), (A3), and (A4), tilt calculation part 112 calculates tilt Oy around the y-axis of block-end surface 30 of optical fiber block 104 relative to substrate-end surface 130 of optical substrate 120.

(A1) Result of the comparison between integrated value AC1 and integrated value AC2,
(A2) Result of the comparison between integrated value AC3 and integrated value AC4,
(A3) Result of the comparison between time width W1 and time width W2, and
(A4) Result of the comparison between time width W3 and time width W4.

In addition, on the basis of the following results of comparisons (B1), (B2), (B3), and (B4), tilt calculation part 112 calculates tilt θx around the x-axis of block-end surface 30 of optical fiber block 104 relative to substrate-end surface 130 of optical substrate 120.

(B1) Result of the comparison between integrated value AC1 and integrated value AC3,
(B2) Result of the comparison between integrated value AC2 and integrated value AC4,
(B3) Result of the comparison between time width W1 and time width W3, and
(B4) Result of the comparison between time width W2 and time width W4.

FIG. 7 is a table showing correspondence relationships between tilts θx and θy and the results of the described-above comparisons, i.e., the comparisons (A1), (A2), (A3), and (A4), and the comparisons (B1), (B2), (B3), and (B4).

In the case where integrated value AC1 equals integrated value AC3, where integrated value AC2 equals integrated value AC4, where time width W1 equals time width W3, and where time width W2 equals time width W4, tilt θx can be determined to be 0 (zero).

In the case where integrated value AC1 is larger than integrated value AC3, where integrated value AC2 is larger than integrated value AC4, where time width W1 is larger than time width W3, and where time width W2 is larger than time width W4, tilt θx can be determined to be positive. The state of tilt θx being positive means the state in which block-end surface 30 of optical fiber block 104 is tilted such that the exit-end surfaces of second optical fibers 106 and 107 are closer to block-end surface 30 of optical substrate 120 than the exit-end surfaces of second optical fibers 108 and 109 are.

In the case where integrated value AC1 is smaller than integrated value AC3, where integrated value AC2 is smaller than integrated value AC4, where time width W1 is smaller than time width W3, and where time width W2 is smaller than time width W4, tilt θx can be determined to be negative. The state of tilt θx being negative means the state in which block-end surface 30 of optical fiber block 104 is tilted such that the exit-end surfaces of second optical fibers 106 and 107 are farther from substrate-end surface 130 of optical substrate 120 than the exit-end surfaces of second optical fibers 108 and 109 are.

In the case where integrated value AC1 equals integrated value AC2, where integrated value AC3 equals integrated value AC4, where time width W1 equals time width W2, and where time width W3 equals time width W4, tilt θy can be determined to be 0 (zero).

In the case where integrated value AC1 is larger than integrated value AC2, where integrated value AC3 is larger than integrated value AC4, where time width W1 is larger than time width W2, and where time width W3 is larger than time width W4, tilt θy can be determined to be positive. The state of tilt θy being positive means the state in which block-end surface 30 of optical fiber block 104 is tilted such that the exit-end surfaces of second optical fibers 106 and 108 are closer to substrate-end surface 130 of optical substrate 120 than the exit-end surfaces of second optical fibers 107 and 109 are.

In the case where integrated value AC1 is smaller than integrated value AC2, where integrated value AC3 is smaller than integrated value AC4, where time width W1 is smaller than time width W2, and where time width W3 is smaller than time width W4, tilt θy can be determined to be negative. The state of tilt θy being negative means the state in which block-end surface 30 of optical fiber block 104 is tilted such that the exit-end surfaces of second optical fibers 106 and 108 are farther from substrate-end surface 130 of optical substrate 120 than the exit-end surfaces of second optical fibers 107 and 109 are.

After tilts θx and θy have been calculated in Step S3 of FIG. 3, tilt adjustment part 115 determines whether or not the thus-calculated tilts θx and θy are all not larger than a predetermined angle (Step S4).

In the case where at least one of tilts θx and θy is larger than the predetermined angle (NO in Step S4), tilt adjustment part 115 adjusts the relative attitude of optical fiber block 104 with respect to substrate-end surface 130 of optical substrate 120, on the basis of the calculated tilts θx and θy (Step S5). Specifically, in Step S5, tilt adjustment part 115 causes optical fiber block 104 to rotate abound the x-axis and y-axis such that tilts θx and θy approach 0 (zero). The processes of Steps S1 to S5 are repeatedly performed until all tilts θx and θy become not larger than the predetermined angle, that is, performed to the extent that block-end surface 30 of optical fiber block 104 can be considered parallel with substrate-end surface 130 of optical substrate 120, thereby adjusting the tilt (attitude) of optical fiber block 104 with respect to optical substrate 120.

In the case where tilts θx and θy are all not larger than the predetermined angle (YES in Step S4), adjustment of the inter-end surface distance between block-end surface 30 of optical fiber block 104 and the substrate-end surface of optical substrate 120 is performed by the processes of Step S6 and subsequent Steps. First, distance adjustment part 116 causes optical fiber block 104 to move, by a preset distance, closer to optical substrate 120 (Step S6).

Hereinafter, the position of optical fiber block 104 before being moved in Step S6 is referred to as the first position, and the position of optical fiber block 104 after having been moved from the first position by a preset distance is referred to as the second position.

Next, optical adjustment apparatus 10 performs a light-detection operation (Step S7). The process of Step S7 is the same as that of Step S1.

Then light detection part 110 outputs the result of detecting reflected lights RL1 to RL4 to calculation part 111 (Step S8). The process of Step S8 is the same as that of Step S2.

Next, on the basis of the result of detection by light detection part 110, distance calculation part 113 calculates the inter-end surface distance between substrate-end surface 130 of optical substrate 120 and block-end surface 30 optical fiber block 104, and then outputs the thus-calculated distance to distance adjustment part 116 (Step S9).

Specifically, distance calculation part 113 compares the variations with time of intensity of reflected light RL1 when optical fiber block 104 is located at the first position with the variations with time of intensity of reflected light RL1 when optical fiber block 104 is located at the second position.

Figure 8A:
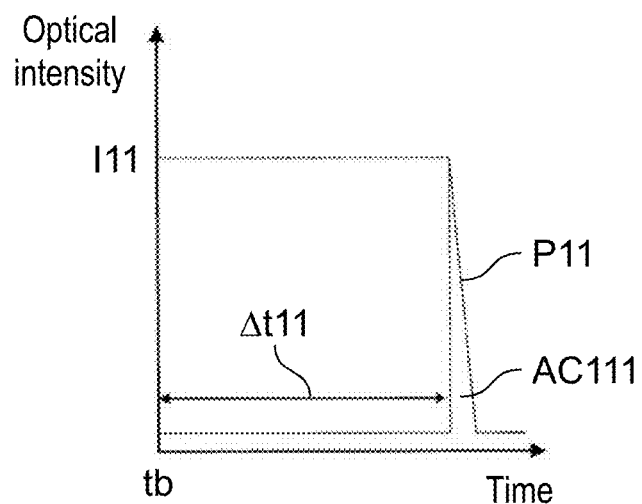
FIG. 8A is a diagram illustrating one example of the result of detecting the reflected light by the light detection part when the optical fiber block locates at a different position.
Figure 8B:
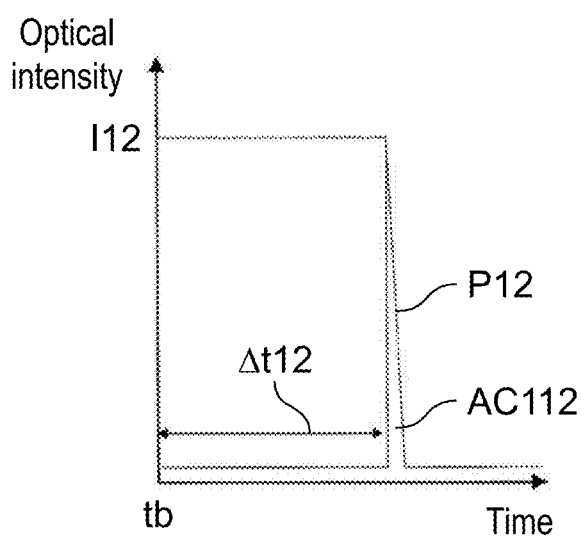
FIG. 8B is a diagram illustrating one example of the result of detecting the reflected light by the light detection part when the optical fiber block locates at another different position.

FIG. 8A is a diagram illustrating one example of the result of detecting reflected light RL1 by light detection part 110 when optical fiber block 104 locates at the first position. FIG. 8B is a diagram illustrating one example of the result of detecting reflected light RL1 by light detection part 110 when optical fiber block 104 locates at the second position.

Time Δt11 in FIG. 8A and time Δt12 in FIG. 8B are the periods of time from time tb when light source 100 emits light L until the times when light detection part 110 starts detecting reflected light RL1. Such periods of time indicate the positions of peaks P11 and P12 in the variations with time of intensity of reflected light RL1.

As shown in FIGS. 8A and 8B, time Δt11 is larger than time Δt12. Maximum intensity I11 of peak P11 is smaller than maximum intensity I12 of peak P12. Moreover, integrated value AC111 at the time of peak P11 is smaller than integrated value AC112 at the time of peak P12.

The reason why time Δt11 is larger than time Δt12 is that the optical path length of reflected light RL1 when optical fiber block 104 is located at the first position is longer than the optical path length of reflected light RL1 when optical fiber block 104 is located at the second position.

Hereinafter, the reason why integrated value AC111 is smaller than integrated value AC112 will be described.

Figure 9A:
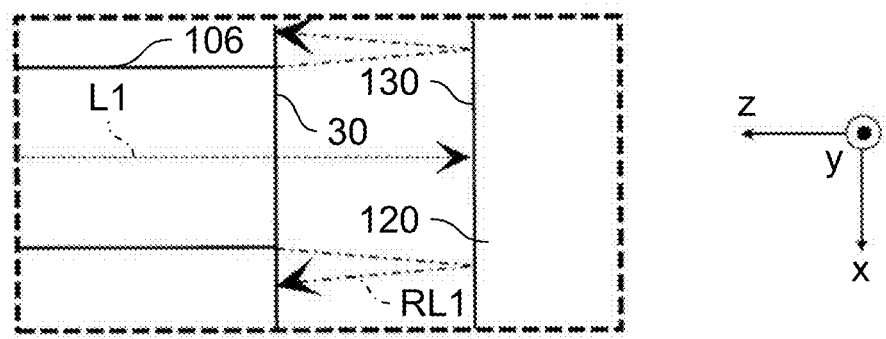
FIG. 9A is a diagram illustrating a difference in reflected light when a fiber block locates at a different position.
Figure 9B:
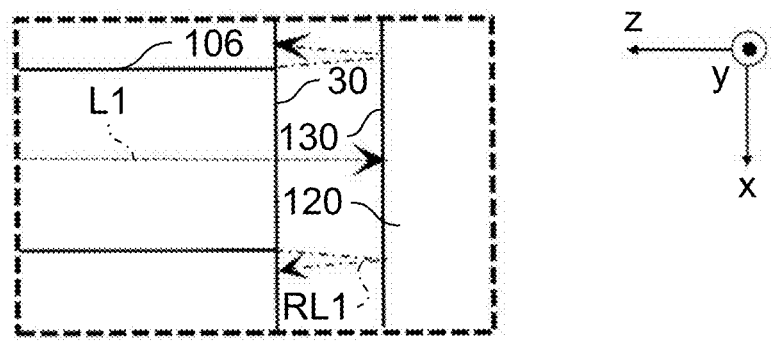
FIG. 9B is a diagram illustrating a difference in reflected light when a fiber block locates at another different position.

FIGS. 9A and 9B are diagrams illustrating behavior of light L1 that exits from second optical fiber 106, is reflected off substrate-end surface 130 of optical substrate 120, and then returns to second optical fiber 106 as reflected light RL1. FIGS. 9A and 9B indicate the states in which optical fiber block 104 is located at the first position and the second position, respectively.

As described above, since light L1 exiting from second optical fiber 106 has a spreading angle in accordance with the numerical aperture of second optical fiber 106, the optical axes of the peripheral lights are tilted toward the outer peripheral side relative to the optical axis of the center light. Accordingly, the irradiation region by reflected light RL1 that arrives block-end surface 30 of optical fiber block 104 spreads and becomes larger in area than the exit-end surface of second optical fiber 106. Therefore, some reflected light RL1 that arrives the outside of the exit-end surface of second optical fiber 106 cannot be received by second optical fiber 106.

As shown in FIGS. 9A and 9B, the closer the surface, i.e., block-end surface 30 (the exit-end surface of second optical fiber 106) of optical fiber block 104 is to substrate-end surface 130 of optical substrate 120, the smaller the difference in area is between the irradiation region by reflected light RL1 and the exit-end surface of second optical fiber 106. This results in an increase in the amount of reflected light RL1 received by second optical fiber 106, which thereby increases the amount of light detected by light detection part 110.

For the above reason, integrated value AC111 is smaller than integrated value AC112.

Moreover, the closer the exit-end surface of second optical fiber 106 is to substrate-end surface 130 of optical substrate 120, the less the light, L1, is prone to spread and the less the difference in arrival time at second optical fiber 106 is prone to occur between the reflected light yielded from the center light and the reflected light yielded from the peripheral lights. For this reason, the peak width of peak P11 is larger than the peak width of peak P12.

In this way, on the basis of both the difference between integrated value AC111 and integrated value AC112 and the difference between time Δt11 and time Δt12, it is possible to calculate the inter-end surface distance between substrate-end surface 130 of optical substrate 120 and block-end surface 30 of optical fiber block 104.

After the inter-end surface distance has been calculated in Step S9 of FIG. 3, distance adjustment part 116 determines whether or not the thus-calculated inter-end surface distance is not larger than a predetermined distance (Step S10). In the case where the calculated inter-end surface distance is larger than the predetermined distance (NO in Step S10), distance adjustment part 116 adjusts the relative position of block-end surface 30 of optical fiber block 104 with respect to substrate-end surface 130 of optical substrate 120, on the basis of the calculated inter-end surface distance (Step S11). Specifically, distance adjustment part 116 moves optical fiber block 104 closer to optical substrate 120 than the second position is. After that, the processes of Steps S7 to S10 are repeatedly performed until the distance of block-end surface 30 of optical fiber block 104 from substrate-end surface 130 of optical substrate 120 becomes not larger than the predetermined distance.

Note that, when Steps S7 to S10 are performed again, the position of optical fiber block 104 before being moved is assumed to be the first position while the position of it after having been moved is assumed to be the second position. Then, on the basis of the result of detecting reflected light RL1 for each of the first and second positions, the inter-end surface distance is calculated.

In the case where the thus-calculated inter-end surface distance is not larger than the predetermined distance (YES in Step S10), optical adjustment apparatus 10 ends the optical adjustment operation.

Note that, after the optical adjustment described above, the position of optical fiber block 104 in an x-y plane is then adjusted to maximize the intensity of the light propagating through waveguide 121 of optical substrate 120. Through this adjustment operation and the optical adjustment operation described above, the optical axis of first optical fiber 105 is appropriately adjusted with respect to waveguide 121 of optical substrate 120.

In the above description, in Step S3 of FIG. 3, the tilt of block-end surface 30 relative to substrate-end surface 130 is calculated based on the time width from the time when the light intensity exhibits the maximum until the time when the light intensity exhibits the most-delayed end of the peak. However, as long as the calculation employs a method based on the peak width that can cover the time width from the time when the light intensity exhibits the maximum until the time when the light intensity exhibits the most-delayed end of the peak, the calculation may not necessarily employ the above-described method. For example, the tilt may be calculated based on the time widths (total peak widths) i.e., the periods from the times when the respective earliest starts of peaks P1 to P4 occur until the times when their respective most-delayed ends occur.

Moreover, in Step S9 of FIG. 3, the times that indicate the positions of peaks P11 and P12 corresponding to reflected light RL1 may be other times instead of times Δt11 and Δt12, which are the periods of time from time tb when light source 100 emits light L until the times when light detection part 110 starts detecting reflected light RL1. For example, the times may be employed that are the periods of time from time tb when light source 100 emits light L until the times when peaks P11 and P12 reach the respective maximum intensities.

<Optical Device 210>

Figure 10:
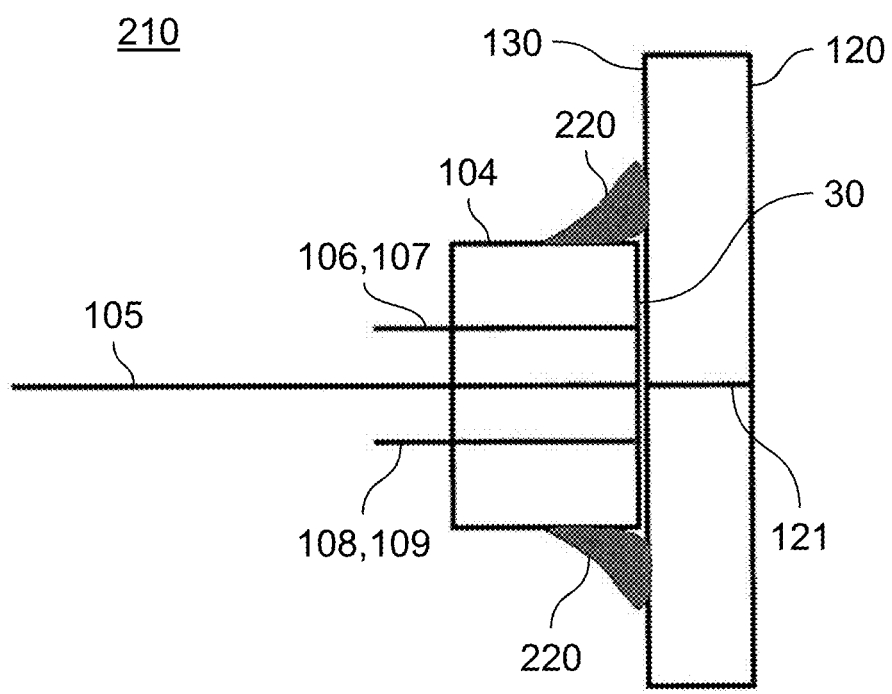
FIG. 10 is a diagram illustrating an optical device according to the embodiment.

FIG. 10 is a diagram illustrating optical device 210 according to the present embodiment. Optical device 210 includes first optical fiber 105, optical substrate 120, and optical fiber block 104. Optical device 210 is formed by coupling optical fiber block 104 to optical substrate 120 in the state of optical fiber block 104 being positioned. Optical fiber block 104 holds first optical fiber 105 and second optical fibers 106 to 109 for use in measurements.

In optical device 210, optical fiber block 104 and optical substrate 120 are bonded with adhesive layer 220, thereby holding the relative positional relation between them. First optical fiber 105 is optically coupled to waveguide 121 of optical substrate 120. In FIG. 12, optical fiber block 104 holds second optical fibers 106 to 109; however, after the optical adjustment of first optical fiber 105 has been completed, optical fiber block 104 may not necessarily hold second optical fibers 106 to 109. In the case where optical fiber block 104 holds second optical fibers 106 to 109, second optical fibers 106 to 109 are inserted into through holes 51 to 54, respectively.

Adhesive layer 220 is a layer that fixes optical fiber block 104 to substrate-end surface 130 of optical substrate 120.

Hereinafter, the process of forming optical device 210 will be described.

First, optical adjustment apparatus 10 described above is used to perform the adjustment (optical adjustment operation) of the relative attitude and relative distance of first optical fiber 105 relative to optical substrate 120. This allows the relative attitude and relative distance of optical fiber block 104 to be appropriately adjusted relative to optical substrate 120.

Next, the position of optical fiber block 104 in an x-y plane is adjusted to maximize the intensity of the light propagating through waveguide 121 of optical substrate 120. Through this adjustment operation and the optical adjustment operation described above, the optical axis of first optical fiber 105 is appropriately adjusted with respect to waveguide 121 of optical substrate 120.

Next, adhesive layer 220 is formed to fix optical fiber block 104 to optical substrate 120. In this process, adhesive layer 220 is formed by applying and curing adhesive such that optical fiber block 104 is physically coupled to optical substrate 120. The adhesive used here is one the optical index of refraction of which has been adjusted. Note that, adhesive layer 220 shown in FIG. 12 bonds between the side surface of optical fiber block 104 and substrate-end surface 130 of optical substrate 120; however, adhesive layer 220 may bond between block-end surface 30 of optical fiber block 104 and substrate-end surface 130 of optical substrate 120.

After that, if necessary, second optical fibers 106 to 109 are cut short. Alternatively, second optical fibers 106 to 109 are removed from optical fiber block 104.

Through the above processes, optical device 210 is formed.

Optical adjustment apparatus 10 according to the present embodiment is optical adjustment apparatus 10 for use in coupling first optical fiber 105 to optical substrate 120 being a coupling destination. Optical adjustment apparatus 10 includes: measurement-light irradiation part 103 that includes a plurality of second optical fibers 106 to 109 and is configured to emit a plurality of lights L1 to L4 with respective timings different from each other via the plurality of second optical fibers 106 to 109, the plurality of lights having a single wavelength; optical fiber block 104 that is configured to hold an exit-side end portion of first optical fiber 105 and exit-side end portions of the plurality of second optical fibers 106 to 109; light detection part 110 that is configured to receive and detect a plurality of reflected lights RL1 to RL4 via the plurality of second optical fibers 106 to 109, the plurality of reflected lights RL1 to RL4 being reflected off substrate-end surface 130 of optical substrate 120 and corresponding to the plurality of lights L1 to L4; tilt calculation part 112 that is configured to compare, with each other, variations with time of intensities of the plurality of respective reflected lights RL1 to RL4 and to calculate tilts θx and θy of optical fiber block 104 relative to optical substrate 120 based on a result of the comparison of the variations with time; and distance calculation part 113 that is configured to calculate an inter-end surface distance between optical substrate 120 and optical fiber block 104, based on a variation with time of an intensity of at least one of the plurality of reflected lights RL1 to RL4.

In accordance with optical adjustment apparatus 10, tilts θx and θy of first optical fiber 105 relative to optical substrate 120, the coupling destination, are measured. Then, on the basis of the thus-measured tilts θx and θy, tilts θx and θy of first optical fiber 105 are appropriately adjusted. This results in the accurate measurement of the inter-end surface distance, which allows an increase in accuracy of the adjustment of the optical axis of first optical fiber 105.

Moreover, since optical adjustment apparatus 10 can accurately measure the inter-end surface distance between optical substrate 120 and optical fiber block 104, it is possible to avoid undesired contact, when adjusting the optical axis, between waveguide 121 of optical substrate 120 and first optical fiber 105.

The distance measurement apparatus disclosed in PTL 1 requires the use of a light source that emits light with wavelengths varying periodically. In addition, the distance measurement apparatus requires the use of a photodetector capable of detecting the intensity of the light with periodically varying wavelengths. Moreover, the distance measurement apparatus needs a signal processor capable of signal processing of the signal from the photodetector in synchronization with the wavelength variations of the light source. In this way, the used of the distance measurement apparatus disclosed in PTL 1 results in an increase in function and complexity of devices involved therein, and further entails an increase in size of the devices.

Optical adjustment apparatus 10 according to the present embodiment has only the configuration in which, via second optical fibers 106 to 109, optical adjustment apparatus 10 emits a plurality of respective lights L1 to L4 to optical substrate 120 with respective timings different from each other and receives respective reflected lights RL1 to RL4 with respective timings different from each other. That is, such a simple configuration allows the measurement of the tilts and distances, which results in no increase in function and complexity of the devices involved therein, entailing no increase in size of the devices. This can bring about simplification and cost-reduction to the devices for use in the measurement of the tilts and distances and to the processes accompanying the measurement.

Moreover, a plurality of second optical fibers 106 to 109 includes three optical fibers 106 to 108 that are disposed such that a plurality of lines inter-connecting the exit-side end portions of the three optical fibers constitutes a triangle. This allows the measurement of tilts θx and θy around two axes (x-axis and y-axis) orthogonal to each other.

The plurality of second optical fibers 106 to 109 has respective optical path lengths different from each other. This allows ease of setting of different emission timings of a plurality of lights L1 to L4.

Measurement-light irradiation part 103 includes light source 100 configured to emit light having a single wavelength, and optical coupler 102. Optical coupler 102 is configured to branch light L emitted from light source 100 into the plurality of lights L1 to L4 having intensities identical to each other, and configured to guide the plurality of lights L1 to L4 to the plurality of respective second optical fibers 106 to 109.

Therefore, without preparing a plurality of light sources 100, light detection part 110 can detect reflected lights RL1 to RL4 with respective timings different from each other. Moreover, since there is no need for light source 100 to emit light to second optical fibers 106 to 109 in respective time slots different from each other, the detection operation of reflected lights RL1 to RL4 can be rapidly completed.

Tilt calculation part 112 calculates tilt θx, around the x-axis (first axis), of optical fiber block 104 relative to optical substrate 120, and tilt θy, around the y-axis (second axis) perpendicular to the x-axis (first axis), of optical fiber block 104 relative to optical substrate 120.

Therefore, block-end surface 30 of optical fiber block 104 can be more reliably made in parallel with substrate-end surface 130 of optical substrate 120.

In calculating tilts θx and θy, based on the variations with time of intensities of reflected lights RL1 to RL4, tilt calculation part 112 calculates integrated values AC1 to AC4 of peaks P1 to P4 corresponding respectively to reflected lights RL1 to RL4, and compares integrated values AC1 to AC4 with each other.

Moreover, tilt calculation part 112 compares, with each other, widths of a plurality of peaks P1 to P4 corresponding respectively to reflected lights RL1 to RL4.

Then tilt adjustment part 115 adjusts, based on calculated tilts θx and θy, a relative attitude of optical fiber block 104 relative to optical substrate 120.

Moreover, optical adjustment apparatus 10 further includes distance adjustment part 116 that adjusts the relative distance of optical fiber block 104 with respect to optical substrate 120.

In calculating an inter-end surface distance, distance calculation part 113 calculates the inter-end surface distance between optical substrate 120 and optical fiber block 104, based on a difference between integrated values AC111 and AC112 of different intensities of reflected light RL1 when optical fiber block 104 locates at different positions.

Moreover, distance calculation part 113 calculates an inter-end surface distance between optical substrate 120 and optical fiber block 104, based on times Δt11 and Δt12 that indicate different positions of the peak of reflected light RL1 when optical fiber block 104 locates at different positions.

Optical device 210 according to the present embodiment includes: first optical fiber 105; optical substrate 120 including a waveguide and being a coupling destination for first optical fiber 105; and optical fiber block 104 fixed to optical substrate 120. Since optical device 210 is formed using the optical adjustment method described above, optical fiber block 104 not only holds first optical fiber 105 but also includes through holes 51 to 54 in which a plurality of lines inter-connecting the through holes constitutes a triangle.

Moreover, as described above, optical device 210 may include second optical fibers 106 to 109 inserted into through holes 51 to 54.

Note that, in the embodiment, optical adjustment apparatus 10 has been described using the example of the coupling between first optical fiber 105 and waveguide 121 of optical substrate 120; however, the description is applicable also to a coupling between first optical fiber 105 and another optical fiber held in the substrate.

MODIFIED EXAMPLES

Optical adjustment apparatus 10 may not include optical coupler 102, in which case second optical fibers 106 to 109 are individually coupled to light source 100. Moreover, second optical fibers 106 to 109 may equal in length to each other, in which case light source 100 emits lights L1 to L4 to respective second optical fibers 106 to 109 with respective timings different from each other.

It is sufficient for optical fiber block 104 to at least include three second optical fibers that are disposed to have respective exit-end surfaces and to cause a plurality of lines inter-connecting the exit-end surfaces to constitute a triangle.

In Step S3 of FIG. 3, the tilt around the y-axis may be calculated based on only described-above (A1) and (A2) or, alternatively, may be calculated based on only described-above (A3) and (A4). In addition, the tilt around the x-axis may be calculated based on only described-above (B1) and (B2) or, alternatively, may be calculated based on only described-above (B3) and (B4).

In Step S9 of FIG. 3, it is sufficient to compare the results, with each other, of detecting the reflected lights via the same second optical fiber. That is, the comparisons may be made between the results of detecting reflected lights RL2 to RL4 via respective second optical fibers 107 to 109 other than second optical fiber 106. Further, the step may include calculating the inter-end surface distances based on the results of detecting a plurality of respective reflected lights RL1 to RL4, followed by taking the average of the thus-calculated inter-end surface distances.

Moreover, in Step S9, the inter-end surface distance may be calculated based on only the result of the comparisons between the integrated values of the peaks or, alternatively, may be calculated based on the result of the comparisons between the times indicating the positions of the peaks.

In accordance with the present disclosure, the optical adjustment apparatus, optical adjustment method, and optical device can be provided each of which is capable of accurately measuring the distance of an optical fiber with respect to an optical substrate, a coupling destination.

INDUSTRIAL APPLICABILITY

The present disclosure is preferably applicable to optical adjustment apparatuses, optical adjustment methods, and optical devices which all are intended to measure the tilt and distance of an optical fiber with respective to an optical substrate, a coupling destination.

DESCRIPTION OF REFERENCE NUMERALS AND SIGNS 10 optical adjustment apparatus
30 block-end surface
41 holder
42 lid
50 through hole
51 through hole
52 through hole
53 through hole
54 through hole
100 light source
101 circulator
102 optical coupler
103 measurement-light irradiation part
104 optical fiber block
105 first optical fiber
106 second optical fiber
107 second optical fiber
108 second optical fiber
109 second optical fiber
110 light detection part
111 calculation part
112 tilt calculation part
113 distance calculation part
114 adjustment device
115 tilt adjustment part 116 distance adjustment part
120 optical substrate
121 waveguide
130 substrate-end surface
210 optical device
220 adhesive layer
AC1 integrated value
AC2 integrated value
AC3 integrated value
AC4 integrated value
AC111 integrated value
AC112 integrated value
L light
P1 peak
P2 peak
P3 peak
P4 peak
P11 peak
P12 peak
RL1 reflected light
RL2 reflected light
RL3 reflected light
RL4 reflected light
tb time
W1 time width
W2 time width
W3 time width
W4 time width
Δt11 time
Δt21 time
Δt12 time

What is claimed is:

1. An optical adjustment apparatus for use in coupling a first optical fiber to an optical substrate being a coupling destination, the first optical fiber having an exit-side end portion, the optical substrate having a substrate-end surface, the optical adjustment apparatus comprising:
a measurement-light irradiation part including
a plurality of second optical fibers having exit-side end portions,
the measurement-light irradiation part being configured to emit a plurality of lights with respective timings different from each other via the plurality of second optical fibers, the plurality of lights having a single wavelength;
an optical fiber block configured to hold the exit-side end portion of the first optical fiber and the exit-side end portions of the plurality of second optical fibers, the optical fiber block having a block-end surface;
a light detection part configured to receive and detect a plurality of reflected lights via the plurality of second optical fibers, the plurality of reflected lights being reflected off the substrate-end surface of the optical substrate and corresponding to the plurality of lights;
a tilt calculation part configured to compare, with each other, variations with time of intensities of the plurality of respective reflected lights and to calculate a tilt of the optical fiber block relative to the optical substrate based on a result of the comparison of the variations with time; and
a distance calculation part configured to calculate an inter-end surface distance between the substrate-end surface of the optical substrate and the block-end surface of the optical fiber block, based on a variation with time of an intensity of at least one of the plurality of reflected lights.

2. The optical adjustment apparatus according to claim 1, wherein the plurality of second optical fibers includes
three optical fibers having respective exit-side end portions and being disposed to cause a plurality of lines inter-connecting the exit-side end portions of the three optical fibers to constitute a triangle.

3. The optical adjustment apparatus according to claim 2, wherein the plurality of second optical fibers has respective optical path lengths different from each other.

4. The optical adjustment apparatus according to claim 3, wherein the measurement-light irradiation part includes:
a light source configured to emit light having the single wavelength; and
an optical coupler configured to branch the light emitted from the light source into the plurality of lights having intensities identical to each other and to guide the plurality of lights to the plurality of respective second optical fibers.

5. The optical adjustment apparatus according to claim 3, wherein the tilt calculation part calculates tilt θx, around a first axis, of the optical fiber block relative to the optical substrate and tilt θy, around a second axis perpendicular to the first axis, of the optical fiber block relative to the optical substrate.

6. The optical adjustment apparatus according to claim 1, wherein the tilt calculation part calculates, based on the variations with time of a plurality of the intensities, integrated values of the plurality of the intensities corresponding respectively to the plurality of reflected lights and compares, with each other, the integrated values of the plurality of the intensities.

7. The optical adjustment apparatus according to claim 1, wherein the tilt calculation part compares, with each other, widths of a plurality of peaks in the variations with time of the plurality of the intensities, the plurality of peaks corresponding respectively to the plurality of reflected lights.

8. The optical adjustment apparatus according to claim 1, further comprising
a tilt adjustment part configured to adjust, based on the tilt calculated, a relative attitude of the optical fiber block relative to the optical substrate.

9. The optical adjustment apparatus according to claim 1, further comprising
a distance adjustment part configured to adjust a relative distance of the optical fiber block with respect to the optical substrate.

10. The optical adjustment apparatus according to claim 1, wherein the distance calculation part calculates the inter-end surface distance between the substrate-end surface of the optical substrate and the block-end surface of the optical fiber block, based on a difference between integrated values of different intensities of at least one of the plurality of reflected lights when the optical fiber block locates at different positions.

11. The optical adjustment apparatus according to claim 1, wherein the distance calculation part calculates the inter-end surface distance between the substrate-end surface of the optical substrate and the block-end surface of the optical fiber block, based on times that indicate different positions of a peak in a variation with time of an intensity of at least one of the plurality of reflected lights when the optical fiber block locates at different positions.

12. An optical adjustment method for use in coupling a first optical fiber to an optical substrate being a coupling destination, the optical adjustment method comprising:

holding, with an optical fiber block, an exit-side end portion of the first optical fiber and exit-side end portions of a plurality of second optical fibers for use in measurement;

emitting, with respective timings different from each other, a plurality of lights having a single wavelength via the plurality of second optical fibers;

receiving and detecting a plurality of reflected lights via the plurality of respective second optical fibers, the plurality of reflected lights being reflected off a substrate-end surface of the optical substrate and corresponding to the plurality of lights;

comparing, with each other, variations with time of intensities of the plurality of respective reflected lights and calculating a tilt of the optical fiber block relative to the optical substrate based on a result of the comparison of the variations with time; and calculating an inter-end surface distance between the substrate-end surface of the optical substrate and a block-end surface of the optical fiber block, based on a variation with time of an intensity of at least one of the plurality of reflected lights.

13. The optical adjustment method according to claim 12, further comprising:

adjusting, based on the tilt calculated, a relative attitude of the optical fiber block relative to the optical substrate; and adjusting, based on the inter-end surface distance calculated, a relative position of the optical fiber block relative to the optical substrate.

\* \* \* \* \*